United States Patent [19]
Sattler

[11] 3,834,400
[45] Sept. 10, 1974

[54] AWNING CONSTRUCTION

[75] Inventor: James L. Sattler, Big Rapids, Mich.

[73] Assignee: Wildwood Products, Inc., Lookout Mountain, Tenn.

[22] Filed: Mar. 29, 1972

[21] Appl. No.: 239,299

[52] U.S. Cl............................................. 131/5 AT
[51] Int. Cl............................................ E04f 10/00
[58] Field of Search............ 135/5 A, 5 AT, 15 PQ; 160/66–78, 82, 399, 402

[56] References Cited
UNITED STATES PATENTS

| | | | |
|---|---|---|---|
| 2,474,158 | 6/1949 | Neely................................ | 160/402 |
| 2,720,885 | 10/1955 | Legg................................. | 135/5 AT |
| 2,805,711 | 9/1957 | Mehl................................. | 160/76 |
| 2,889,840 | 6/1959 | McIlwaine........................ | 135/5 AT |
| 3,004,591 | 10/1961 | King, Jr. ......................... | 160/67 |
| 3,612,145 | 10/1971 | Darula............................. | 135/5 AT |

*Primary Examiner*—Peter M. Caun
*Attorney, Agent, or Firm*—McGarry & Waters

[57] ABSTRACT

An awning construction for travel vehicles and the like in which an awning fabric is secured at one end to the vehicle and is supported at its outer end by a frame including an end bar to which the outer portion of the fabric is attached and side arms to which the end bar is rotatably attached. The lower ends of the side bars are attached for slidable movement to the side of the vehicle or can be disposed vertically and secured to a helical spring stake for supporting the outer end of the awning. Spring loaded and extendable rafters extend from the vehicle beneath the fabric and engage the end bar in locking relationship thereto to prevent rotational movement of the end bar with respect to the rafters. The fabric is attached to the end bar by a special clamp and the lower front portion of the end bar so that the awning fabric is drawn taut around the top and front side of the end bar. The slidable mounting for the side bars is secured to the vehicle through a channel bracket which is securely fastened to the vehicle and which distributes the force from the side bars along the side of the vehicle.

6 Claims, 11 Drawing Figures

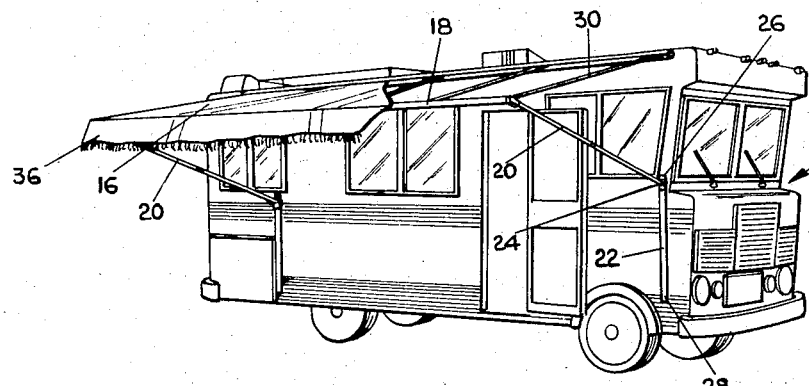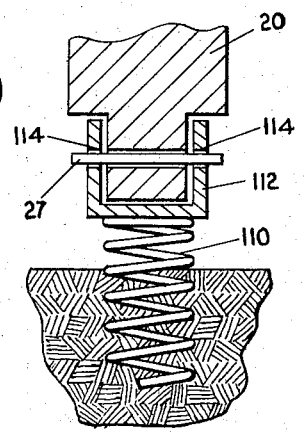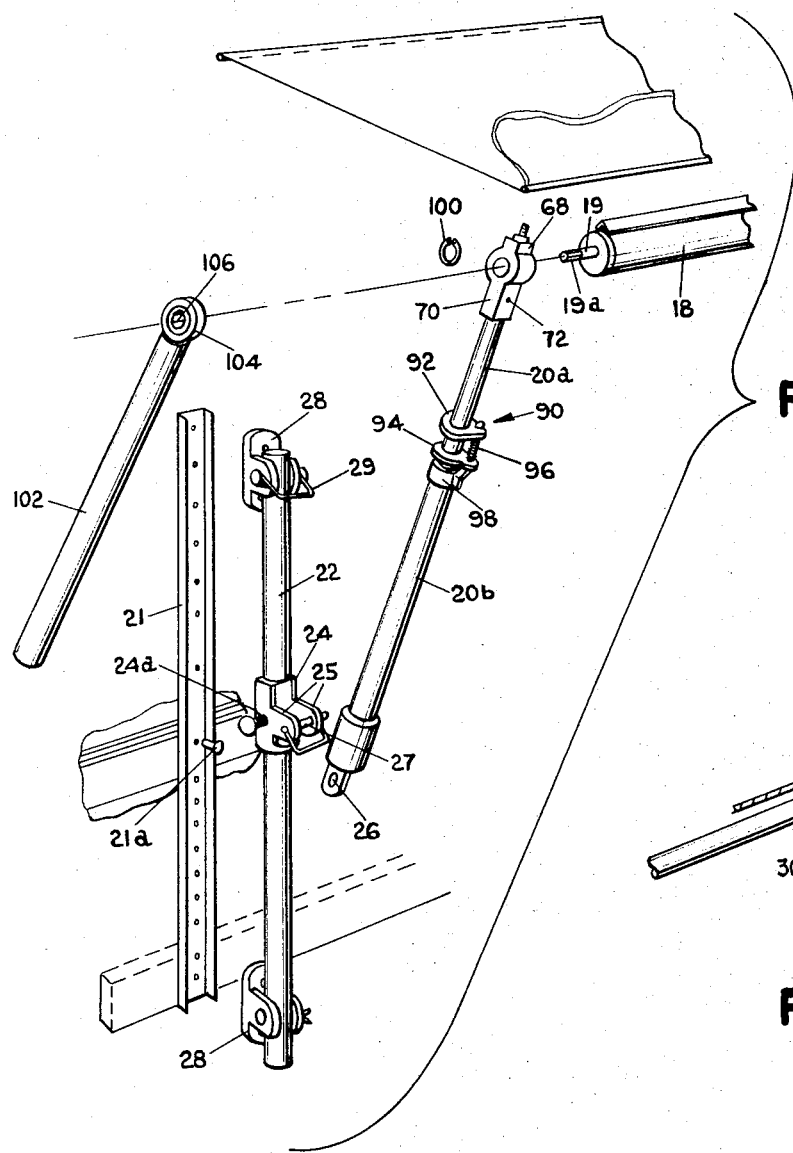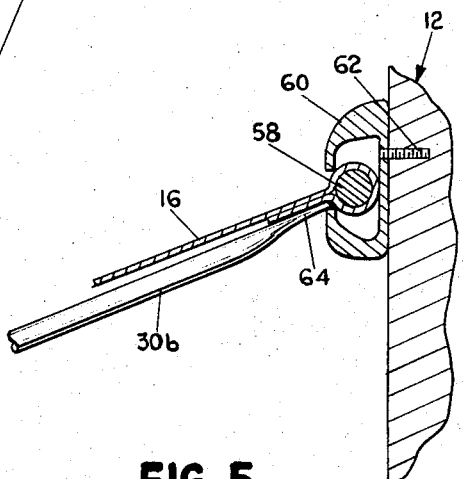
FIG. 1
FIG. 9
FIG. 2
FIG. 5

AWNING CONSTRUCTION

BACKGROUND OF THE INVENTION

1. Field of the Invention

This invention relates to awning constructions. In one of its aspects, the invention relates to an awning construction which is secured to the side of a travel vehicle such as a travel trailer or a motorized travel vehicle. In another of its aspects, the invention relates to a roll up awning which is secured to the side of a travel vehicle.

2. State of the Prior Art

Awnings for travel trailers and the like are well known. Generally, awnings are attached to the upper portion of the travel vehicle through a C-shaped awning clamp which engages a rope bead on the inner end of the awning. The awning extends outwardly from the vehicle and is supported by a frame which includes an end bar and a pair of side arms, which in some cases, rotatably support the end bar for rolling up of the fabric awning. The outer end of the fabric awning is secured to the roller bar by gluing or inserting a rope bead within the end bar. The side arms can in some cases be detached from the side of the vehicle at the bottom portions thereof and secured verticaly by a stake in the ground beneath the end bar. A flap on the end of the awning extends down over the front bar. This type of structure usually results in a sag in the awning near the outer portion thereof wherein rain water collects. Further, the flap of the awning frequently is blown by the wind up over the end bar and remains on top of the awning. The stakes provide a rigid connection between the awning and the ground when the side arms are vertical. Gusts of wind can rip the fabric or bend the poles.

The side arms have also been made telescoping so that the height of the end of the awning above the ground can be adjusted. However, adjustment of one of the side arms with respect to the other, as in the case when done by one person, results in a binding or bending moment at the rotatable connection between the side arms and the end bar. In some cases, the rotatable connection can actually be bent or broken off by such action.

Some structures also employ vertical slide bars at the side of the travel vehicle for slidably mounting the bottom end of the side arms. These vertical slide bars must be securely fastened to the vehicle and for this reason are usually secured to frame components of the vehicle at the top and bottom portion of the vehicle. The side arm would thus be in normal position for supporting the end bar when its connection to the vertical slide bar is in a central portion thereof. In this position, gusts of wind tend to distort and bend the slide bar due to the fact that there are no reinforcements for the slide bar in the central portion thereof where the pulling force is applied.

BRIEF STATEMENT OF THE INVENTION

According to the invention, an awning construction for a vehicle has an awning fabric secured at one end to a vehicle and extending outwardly thereof. A frame supports the awning fabric and comprises a front bar, a pair of side arms at the side of the front bar, means for rotatably coupling the front bar to the side arms and rafter means extending from the vehicle to the front bar to brace the front bar with respect to the vehicle. The fabric is secured to the front bar through a clamp which is positioned on the bottom portion of the front bar with the fabric being drawn over and in front of the front bar. In order to prevent rotation of the front bar with respect to the side arms and the rafters and in order to maintain the awning in its position drawn over and in front of the front bar, interengaging means on the end of the rafter and on the front bar lock the front bar against rotation with respect to the rafter. Desirably, the interengaging means comprises a pin on the end of the rafter and a pair of openings oppositely disposed in the front bar with the pin projecting through both of the openings in the front bar. Preferably, the pin is biased outwardly with respect to the rafters, for example with a spring, and contains stop means to limit the extent to which the pin extends into the front bar. This construction prevents rotation of the front bar with respect to the rafter and biases the end of the awning and the front bar outwardly with respect to the vehicle. This construction eliminates the dip or sag in the awning and also minimizes the blowing of the flap up over the awning.

Preferably, the rafter is flattened at the inner end thereof and is retained within a C-shaped clamp on the vehicle which also secures the inner end of the awning fabric. Also according to the invention the side arms are detachably mounted at a bottom portion to vertically mounted slide bars. Channel brackets are securely mounted to the frame of the vehicle and the slide bars are mounted to the vehicles through the channel brackets. A clamp is desirably provided at the upper portion of the slide bar for securing the side arms in vertical position when the awning is rolled up.

Further, according to the invention, a helical shaped spring stake is provided for alternately mounting the bottom of the side arm on the ground vertically beneath the end bar. The spring stake provides some flexibility of movement of the side bars in the event that a gust of wind blows the awning fabric.

Still further according to the invention, the rotatable connection between the end bar and the slide bar provides an adjustable bearing so that the frictional force between the bearing and the end bar can be adjusted for assistance in rolling up the awning. In addition, the coupling between the slide bar and the end bar provides for lateral pivotable movement of the side arms with respect to the end bars to avoid binding and bending moment of the side arms when one of the side arms is raised or lowered with respect to the other side arm.

Other aspects, objects, and the several advantages of this invention will be apparent to one having ordinary skill in the art to which the invention pertains from the following description of the drawings and the appended claims.

BRIEF DESCRIPTION OF THE DRAWINGS

The invention will now be described with reference to the accompanying drawings in which:

FIG. 1 is a perspective view of the awning construction according to the invention positioned on a travel vehicle;

FIG. 2 is an exploded view of a portion of the frame of the awning construction;

FIG. 5 is a partial sectional view illustrating the manner in which the awning is secured to the travel vehicle;

FIG. 9 is a partial view illustrating an alternative mounting for the side support arms.

DETAILED DESCRIPTION OF THE PREFERRED EMBODIMENT

Figure 4:
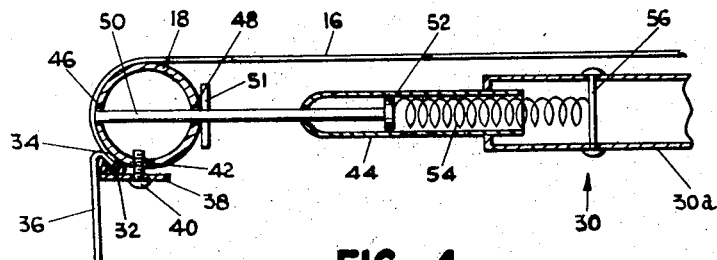
FIG. 4 is a partial sectional view illustrating the manner in which the awning is secured to the outer end of the frame and the manner in which the rafter supports engage a frame end bar.

Referring now to the drawings, and to FIGS. 1 and 2 in particular, there is illustrated a travel vehicle 12, which may be a motorized vehicle, or may be the type of travel trailer which is intended to be drawn behind an automobile, the travel vehicle having an awning fabric 16, secured to the travel vehicle 12 at one end thereof and extending outwardly from the vehicle. A frame supports the awning 16. The frame comprises a front roller bar 18 horizontally disposed at the outer end of the awning 16 and a pair of side arms rotatably secured to either end of the front roller bar 18. The side arms are slidably mounted at the inner ends thereof on a pair of vertical slide bars 22 which are secured to the vehicle through a pair of mounting brackets 28. A plurality of rafters 30 extend from the vehicle to the front roller bar 18 in supporting relationship to the awning fabric 16. Bracket channels 21 are also secured to the side of the vehicle and retain the mounting brackets 28 and distribute the load of the awning more evenly along the side of the vehicle with conventional fasteners 21a extending through the bracket channels and into studs in the vehicle. The brackets 28 can then be positioned in any desired location along the length of the bracket channel 21 without regard to the vehicle studs. By this construction, force applied by the brackets 28, which force might otherwise dent the vehicle or pull the brackets 28 loose from the vehicle, does not affect the connection of the bracket 28 to the vehicle. The slide bars 22 are secured to the mounting brackets 28 through a pin having a U-shaped retainer 29.

A collar 24 is slidably mounted on each slide bar 22 and is locked in various adjusted positions therealong by a set screw 24a. The collar 24 has a pair of ears 25 and a pin 27 which extends through a hole 26 on the flat inner end of the side arm 20 to pivotably mount the side arm 20 to the collar 24. The pin 27 is removably retained in the ears 25 by a keeper or other suitable means so that the bottom of the side arms 20 can be easily detached and remounted on the collar 24.

The side arms 20 are made in two telescoping portions 20a and 20b for adjustment of the awning height. These two telescoping portions 20a and 20b, are held in adjusted position by an extension control lock 90 formed by rings 92 and 94 biased apart by spring 96. A collar 98 is secured to the bottom ring so that the control lock 90 is fixed with respect to the arm portion 20b. The outer portion 20a of the side arm 20 is slidably received by the rings 92 and 94, and is telescopingly received by the inner arm portion 20b. The rings are wedged apart by the spring 96 to bind the arm portion 20a with respect to the rings. Depressing the ring 92 permits the outer portion 20a to extend upwardly with respect to the inner portion 20b and lifting the ring 94 permits the outer portion 20a to be retracted downwardly into the inner portion 20b.

The roller bar 18 comprises one or more annular pipes joined end to end and having journals 19 extending therefrom. The annular pipes are desirably formed of interlocking sections so that the length of the roller bar can be selected to accommodate different width fabric awnings. The very ends of the journals are forged at 19a to form hexagonal nuts for engagement with a wrench. Preferably, two separate sizes are forged on the end of each journal so that different size wrenches can be employed to rotate the roller bar 18 for rolling up or rolling down the awning.

Figure 3:
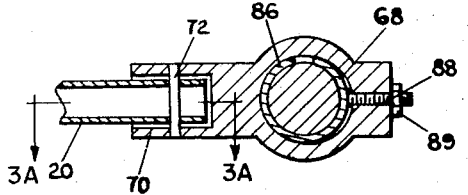
FIG. 3 is a partial sectional view through the end of the side arm and front roller bar illustrating the connection therebetween.
Figure 3A:
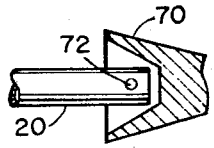
FIG. 3A is a partial sectional view seen along lines 3A — 3A of FIG. 3.

Referring now to FIGS. 2, 3, and 3A, the outer end of the side arm 20 has a sleeve 70 mounted thereto through pin 72. The sleeve is bell-shaped in a direction perpendicular to the pin 72 to permit pivotable movement of the side arm 20 with respect to the sleeve 70 as seen in FIGS. 3 and 3A. The journal 19 is received within an annular collar 68 which is integrally formed with the sleeve 70. A retaining ring 100 retains the sleeve 70 on the end of the journal 19. To this end, the journal has a reduced diameter near its outer end. In the assembled position shown in FIG. 1, the forged hex nut portions 19a of journal 19 extend outwardly at the sleeve 70 for engagement with a wrench. A split ring lock nut 86 surrounds the journal 19 within the collar and forms a bearing for the journal 19. A screw 88 threadably engages a bore in the collar 68 and engages the lock nut 86. The friction between the journal 19 and the bearing 86 is controlled by the pressure exerted by screw 88. A lock nut 89 is threaded on the outer portion of the screw 88 to lock the screw 88 in its adjusted position.

Desirably, a ratchet wrench is provided to engage the hex nut on the journal 19 of the roller bar 18. A suitable ratchet wrench is illustrated in FIG. 2 and includes a handle 102, a housing 104 secured at an end to the handle and a hex nut engaging rotatable ratchet means 106. The ratchet means 106 is rotatably mounted within the housing to turn in one direction only and for this purpose employs a well known ratchet mechanism (not shown). The wrench is used in one orientation to roll up the awning and is used in another orientation to roll down the awning.

Reference is now made to FIG. 4 for a description of the manner in which the awning fabric 16 is secured to the front roller 18. A rope bead 32 is positioned within a sling 16 in an end portion of the awning fabric 16. The sling 34 is formed by doubling over the awning fabric and sewing around the rope bead therein, although sewing of the rope bead is not necessary. A flap 36 is left hanging below the connection between the awning fabric 16 and the sling 34. An L-shaped clamp 38 retains the rope bead 34 and is secured to the roller bar 18 through screw fasteners 40. The L-shaped clamp 38 clamps the sling portion with the rope bead therein firmly to the roller bar 18.

Figure 6:
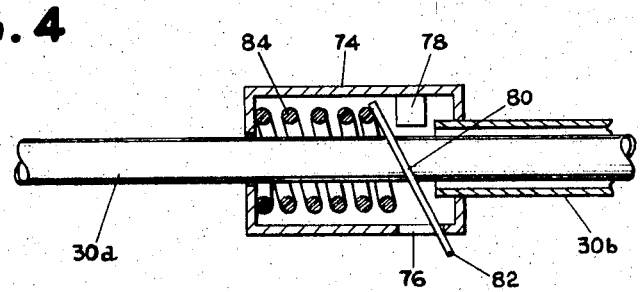
FIG. 6 is a partial sectional view illustrating the adjustable connection of the rafter supports.

Also illustrated in FIG. 4 is the connection between the rafters 30 and the roller bar 18. The rafters 30 are generally hollow in construction and are formed in two telescoping parts 30a and 30b (FIG. 6). At the outer end of part 30a an extension 44 is secured thereto for reception of a telescoping retractable pin 50. A washer 52 is mounted at the inner end of the pin 50 and abuts a spring 54. The inner end of spring 54 is anchored to rafter part 30a through a pin 56. The retractable pin 50 is thus spring-biased outwardly by the spring 54. A pair of apertures 46 and 48 in the end bar 18 are provided for reception of the pin 50. The pin 50 extends all the way through the end bar 18 to hold that bar 18 rigid against rotation about the longitudinal axis thereof with respect to the rafters 30. A stop 51 on pin 50 restricts the movement of the pin 50 into the roller bar 18. The rafters 30 are thus spring loaded between the vehicle and the front roller bar 18.

Reference is now made to FIG. 5 which illustrates the manner in which the awning fabric 16 is attached to the vehicle 12. A C-shaped awning rail 60, which is conventional in the trade, is secured to the vehicle 12 through conventional fasteners 62. The inner end of the awning fabric 16 has a rope bead 58 secured thereto by doubling back the inner end of the fabric 16 and sewing the two fabric portions together. The rope bead is inserted longitudinally within the C-shaped awning rail 60 in conventional fashion. The inner ends 64 of the rafters 30 are flattened and are received and retained in the C-shaped rails. The tension bars 30 thus extend from the travel vehicle 12 beneath the fabric 16 to the front roller bar 18.

Reference is now made to FIG. 6 which illustrates the manner in which the telescoping parts 30a and 30b of the rafters are adjustably joined together. The front part 30a has a diameter smaller than the back part 30b and is telescopingly received thereby. A connector collar 74 is secured at one end to the outer end of the part 30b. The connector collar 74 is hollow in construction and houses a ring 80 through which passes the front part 30a of the rafter support. A tab 82 extends from the ring 80 into a slot 76 formed in the collar 74. A spring 84 is retained by a closed end of the collar 74 and biases the ring 80 in a skewed position with respect to the axis of the front part 30a as illustrated in the drawing.

The ring 80 has an opening slightly larger than the diameter of the front rafter part 30a. In the skewed position illustrated in the drawing, the ring is wedged against the front rafter part 30a to prevent further movement of the rafter part 30a into the rafter part 30b. In order to move the rafter part 30a with respect to the rafter part 30b, the tab 82 is engaged and pushed forwardly, i.e., to the right as illustrated in FIG. 6 so that the ring is substantially perpendicular to the axis of front rafter part 30a. When this condition exists, the rafter part 30a is freely slidable within the ring 80 and therefore can be moved with respect to the rear rafter part 30b.

Figure 10:
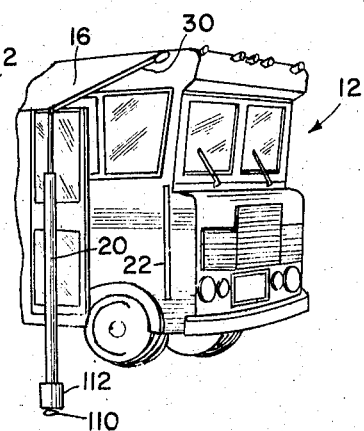
FIG. 10 is a partial view illustrating the alternate mounting of the side arm support arms between the extended awning and the ground.

Reference is now made to FIGS. 9 and 10 which show the manner in which the side arms can be alternately staked to the ground. A spring stake 108 comprises a helical spring 110, the bottom portion of which is screwed into the ground, and a U-shaped bracket 112 welded to the top of the helical spring 110. Holes 114 are provided at opposite sides of the U-shaped bracket 112 for reception of a pin 27. As seen in FIG. 9, the flattened end portion of the side arm 20 fits into the U-shaped bracket 112 and the hole 26 therein is aligned with holes 114 for receiving the pin 27.

With the construction illustrated in FIGS. 9 and 10, the side arms 20 are yieldably mounted on the ground so that the side arms can yield when large gusts of wind apply substantial force to the awning fabric.

OPERATION

The assembly of the awning and frame is as follows: The bracket channels 21 are first secured to the side of the vehicle. The studs of the vehicle are located and the fastening members are secured through the bracket channels to the vehicle studs. Next the frame is assembled. The front roller bar is rotatably mounted onto the outer ends of the side arms 20. The side arms are retained on the journals by applying the retaining ring 100. The mounting brackets 28 are then secured to the vehicle through the bracket channels 21. The slide rods 22 are then mounted onto the mounting brackets. The side arms 20 are rotatably secured to the collar 24 which is at its lowermost position on the slide 22.

The awning fabric is then secured at its inner end to the C-shaped awning rail 60 by threading the rope bead therethrough from one end. Next, the outer end of the awning fabric 16 is secured to the front roller bar. Initially, the front roller bar is in a position displaced 180° from that position illustrated in FIG. 4 so that the L-shaped clamp would normally lie on top thereof. The clamp 36 is loosened on the roller bar 18 so that the rope bead 32 within the sling 34 can be inserted within the recess of the L-shaped clamp. The screws 40 are then tightened while holding the clamp 38 against the roller bar 18 with the rope bead 32 therebetween. During this operation, the front part of the awning and the front roller bar 18 is low enough to the ground by virtue of the fact that the collar 24 is at the lowermost position on the slide bar 22 so that the fastening operation can take place by persons of normal height without resorting to ladders, stools and the like. Next, the wrench is used to rotate the front roller bar 18 about its axis approximately 180° in a counterclockwise direction as viewed in FIG. 4 to the position illustrated therein. The rafters are then inserted through the roller bars at one end and are adjusted to the proper length so that the other end fits into the C-shaped awning rail 60 as illustrated in FIG. 5. Thereafter the length of the side arms can be adjusted for proper height of the awning. The rafters are preferably adjusted so that a tension is provided whereby the retractable pin 50 is spring loaded against the front roller bar 18. This spring loading of the rafters holds the awning taut and eliminates sag on the top of the awning. Further, by attaching the awning in the lower front portion of the roller bar 18, the flap 36 is retained in the downwardly hanging position. Regardless of the manner in which the wind blows the flap 36, it will always return to its downwardly extending position because it is held at the lower front portion of the front roller bar.

Because the fabric 16 is held taut by the tension bars 30, and because the awning fabric is rolled about 180° around the front of the front roller bar 18, there is a tendency by the fabric to rotate the front roller bar 18 in a clockwise direction as viewed in FIG. 4, which would produce sag in the fabric. However, the engagement of the front roller bars by the retractable pin 50 rigidly holds the front roller bar 18 fixed with respect to the rafters 30. Thus, by the frame construction, the awning is held taut and the flap is always constrained to its depending position.

After assembly of the awning as described above, the side arms 20 are raised at the inner ends thereof simply by raising the collars 24 on the slide bar 22. Generally, the collars are raised to the uppermost position on the slide bar 22 as illustrated in FIG. 1 of the drawings. In this position, any pulling force on the slide bars 22 by the side arms due to gusts of wind, etc., is transmitted directly to the upper mounting bracket 28. Thus, there is little likelihood that the slide rod 22 will bend as, for example, if the collar 24 were positioned in the central portion of a long slide bar. The bracket channel 21 eliminates the need for a long slide bar which is sometimes necessary to securely fasten the side arm to the vehicle. This would normally be the case in the absence of the bracket channels 21 since the mounting brackets 28 must be anchored to the vehicle. The bracket channels 21 provide the means for securely fastening the mounting brackets 21 to the vehicle while eliminating the need for a long slide bar.

The frame construction is simple enough so that one person can easily assemble the frame and awning. When carried out by one person, the side arms 20 are raised independently. When one side arm is raised with respect to the other, a bending moment or binding force normally results between the journal 19 and the collar 68. However, due to the pivotable connection of the outer end of the side arm 20 in the bell-shaped sleeve 70 the binding or bending moment on the journal is eliminated. The universal type of connection between the side arm and the front roller bar 18 thus prevents bending and breakage of the journal 19 when the side arms are raised independently.

Figure 7:
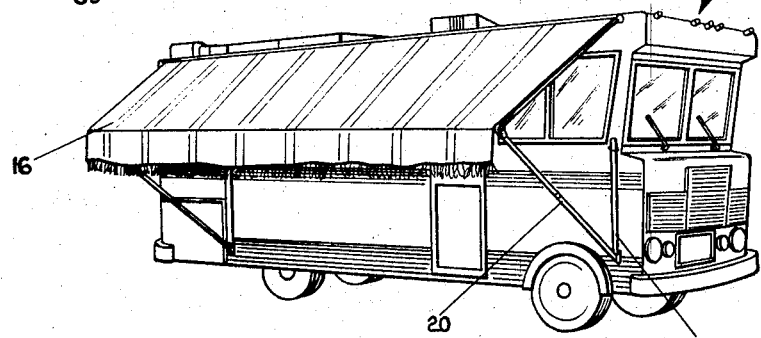
FIG. 7 is a perspective view, like FIG. 1, illustrating the manner in which the awning can be lowered for installation or for rolling up.
Figure 8:
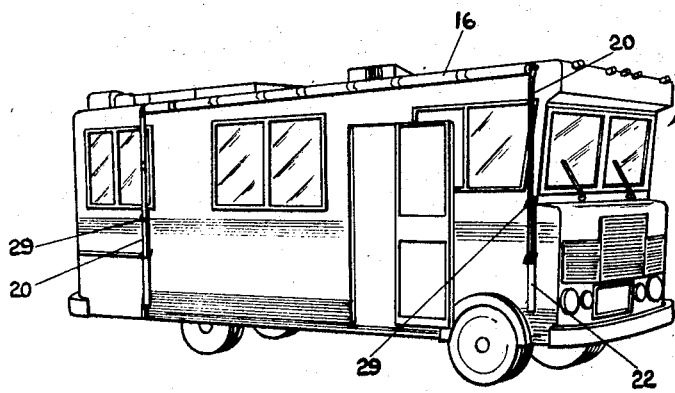
FIG. 8 is a perspective view, like FIG. 1, illustrating the awning in the rolled up position and stored at the side of the vehicle.

The awning is rolled up as follows: The rafters are removed from engagement with the C-shaped awning rail and from engagement with the front roller bar 18. For this purpose, the awning is lowered by lowering the side arms 20 on the slide bar 22, for example to the position illustrated in FIG. 7. The rafter 30 is forced forwardly against the tension of spring 54 and then lowered at the inner end so that the pin 50 can be removed from engagement with the front roller bar 18. After the rafters have been removed, the wrench is positioned on the end of the journal 19, engaging the hex nut formed thereon and the rafter is rolled in a counterclockwise direction as viewed in FIG. 4. The friction on the journal 19 is adjusted by the screw 88 so that when the ratchet wrench is used, the roller bar 18 will not unroll during the ratcheting operation. In the roll up operation, it is important that the fabric roll up evenly on both sides. This even roll up is aided by even frictional force on the journals 19 and by the clevis coupling between the collar 24 and the side arms 20. When the awning has reached its rolled up position as illustrated in FIG. 8, the retainer 29 is claimed around the side arm 20 to retain the side arm 20 secured in a vertical position.

To unroll the awning, the reverse of the above described procedure is followed.

The awning construction described above provides a simple an easily assembled frame for an awning which is also durable in construction and easy to operate.

Reasonable variation and modification are possible within the scope of the foregoing disclosure, the drawings, and appended claims without departing from the spirit of the invention.

The embodiments of the invention in which an exclusive property or privilege is claimed are defined as follows.

1. In an awning construction for a vehicle wherein an awning fabric is secured at one end to a vehicle and extends outwardly thereof; a frame supports the awning in suspended position above the ground, said frame having a front bar, means securing said fabric at an outer portion to said front bar, a pair of side arms at the sides of said front bar, and means for rotatably coupling said front bar to said side arms whereby said side arms support said front bar and said fabric outer portion; the improvement which comprises:

means mounting the inner end of said side arms to the side of said vehicle for vertical movement with respect thereto; and said rotatable coupling means between the outer end of said side arms and said front bar includes a pivotable connection to permit said side arm to pivot about an axis perpendicular to the axis of said front bar and perpendicular to the axis of said side arm to eliminate stress on the rotatable coupling means during vertical movement of one end of said front bar with respect to the other.

2. The awning construction of claim 1 wherein said mounting means for said inner end of said side arm includes a vertical channel bracket securely mounted to said vehicle, upper and lower mounting brackets secured to said vehicle through said channel bracket; a slide bar vertically mounted to said mounting brackets; and means slidably mounting said inner end of said side arm to said slide bar, whereby the force on said side arms is distributed to the side of said vehicle by said channel bracket.

3. The awning construction of claim 2 and further comprising means for locking said slidable mounting means in a plurality of adjusted positions on said slide bar.

4. In an awning construction for a vehicle, wherein an awning fabric is secured at one end to a vehicle and extends outwardly thereof, a frame supports the awning in suspended position above the ground, said frame having a front bar, means securing said fabric at an outer portion to said front bar, a pair of side arms at the sides of said front bar, and means for rotatably coupling said front bar to said side arms, whereby said side arms support said front bar and said fabric at an outer portion thereof; the improvement which comprises:

helical spring stakes secured to the ground beneath the ends of said front bars; and means securing a bottom end of said side arms to said spring stakes, whereby said side arms are resiliently coupled to the ground to yield under wind pressure applied to said awning.

5. The awning construction of claim 4 and further including means for detachably securing said bottom end of said side arms to a side of said vehicle; and said means for securing said bottom of said side arms to said spring stakes is detachable so that said side arm bottom ends can be alternately secured to said spring stakes or to the side of said vehicle.

6. The awning construction of claim 4 wherein said side arms are constructed of first and second telescoping parts, and means for locking first and second telescoping parts in adjusted positions with respect to each other, whereby the length of said arms can be adjusted.

* * * * *